United States Patent
Gosala et al.

(10) Patent No.: US 12,282,384 B2
(45) Date of Patent: Apr. 22, 2025

(54) SYSTEMS AND METHODS FOR DETECTING DRIFT

(71) Applicant: JIO PLATFORMS LIMITED, Gujarat (IN)

(72) Inventors: Udaya Kamala Gosala, Maharashtra (IN); Ranchal Prakash, Kerala (IN); George Cherian, Kerala (IN); Raghuram Velega, Maharashtra (IN)

(73) Assignee: JIO PLATFORMS LIMITED, Gujarat (IN)

( * ) Notice: Subject to any disclaimer, the term of this patent is extended or adjusted under 35 U.S.C. 154(b) by 0 days.

(21) Appl. No.: 18/028,495

(22) PCT Filed: Jan. 19, 2023

(86) PCT No.: PCT/IB2023/050455
§ 371 (c)(1),
(2) Date: Mar. 24, 2023

(87) PCT Pub. No.: WO2023/139510
PCT Pub. Date: Jul. 27, 2023

(65) Prior Publication Data
US 2024/0303148 A1    Sep. 12, 2024

(30) Foreign Application Priority Data
Jan. 19, 2022   (IN) .............................. 202221003094

(51) Int. Cl.
*G06F 11/07*   (2006.01)
(52) U.S. Cl.
CPC .................................. *G06F 11/079* (2013.01)
(58) Field of Classification Search
CPC .............................. G06F 11/079; G06N 20/20
See application file for complete search history.

(56) References Cited

U.S. PATENT DOCUMENTS 10,410,135 B2   9/2019  Shumpert
11,227,192 B1*  1/2022  Rahnama-Moghaddam ...............
                                                G06F 18/214
(Continued)

FOREIGN PATENT DOCUMENTS

CN    113033643 A    6/2021
WO    2021044192 A1  3/2021

OTHER PUBLICATIONS

Samuel Ackerman et al., "Automatically detecting data drift in machine learning classifiers", arXiv preprint arXiv:2111.05672, Nov. 10, 2021, Total Pages 09.
(Continued)

*Primary Examiner* — Kamini B Patel
(74) *Attorney, Agent, or Firm* — Procopio, Cory, Hargreaves & Savitch LLP

(57) ABSTRACT

Present disclosure relates to management of artificial intelligence systems by identifying root cause of reduced performance and/or failure in computing systems, and particularly relates to systems and methods for detecting a drift in supervised and unsupervised machine learning (ML) models. The system retrieves current dataset corresponding to output of supervised ML models and unsupervised ML models. Further, the system segregates the current dataset based on requirement of a drift detection model and applies a plurality of drift detection models to the segregated dataset to generate predictive results corresponding to the current dataset. Furthermore, the system determines errors in predictive results by comparing predictive results to reference values associated with current dataset. Additionally, the system detects the drift in supervised ML models and unsupervised ML models based on determined errors being above a threshold value. The supervised ML models and
(Continued)

unsupervised ML models are corrected based on detected drift.

19 Claims, 11 Drawing Sheets

(56) References Cited

U.S. PATENT DOCUMENTS

| | | | |
|---|---|---|---|
| 2017/0330109 A1* | 11/2017 | Maughan | G06N 5/04 |
| 2020/0012900 A1* | 1/2020 | Walters | G06F 16/254 |
| 2021/0133632 A1* | 5/2021 | Elprin | G06N 20/10 |
| 2021/0224696 A1* | 7/2021 | Nasr-Azadani | G06N 5/04 |
| 2021/0334695 A1* | 10/2021 | Raj | G06F 11/3409 |
| 2021/0406726 A1* | 12/2021 | Khatami | G06N 5/04 |
| 2022/0024032 A1* | 1/2022 | Singh | B25J 9/1653 |
| 2022/0036201 A1* | 2/2022 | Tamir | G06N 20/10 |
| 2022/0383038 A1* | 12/2022 | Hines | G06N 3/045 |
| 2022/0400121 A1* | 12/2022 | Han | G06N 5/025 |
| 2023/0004854 A1* | 1/2023 | Calmon | G06N 3/098 |
| 2023/0126695 A1* | 4/2023 | Hatten | G06N 3/045 706/15 |
| 2023/0126842 A1* | 4/2023 | Tabet | G06F 11/079 714/26 |
| 2023/0139718 A1* | 5/2023 | Valipour | G06N 3/006 706/12 |
| 2024/0005199 A1* | 1/2024 | Butvinik | G06Q 40/02 |
| 2024/0028944 A1* | 1/2024 | Gottin | G06N 20/00 |
| 2024/0037457 A1* | 2/2024 | Bhattacharjee | G06N 20/00 |
| 2024/0095547 A1* | 3/2024 | Gupta | G06N 5/022 |
| 2024/0112066 A1* | 4/2024 | Ba | G06N 20/00 |
| 2024/0112070 A1* | 4/2024 | Fr?hlich | G06N 5/04 |

OTHER PUBLICATIONS

International Search Report, PCT/IB2023/050455, mailed May 23, 2023, Total Pages 02.

* cited by examiner

SYSTEMS AND METHODS FOR DETECTING DRIFT

FIELD OF INVENTION

The embodiments of the present disclosure generally relate to management of artificial intelligence systems by identifying a root cause of reduced performance and/or failure in computing systems. More particularly, the present disclosure relates to systems and methods for detecting drift in supervised and unsupervised machine learning models.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Generally, when a Machine Learning (ML)/Artificial Intelligence (AI) model is deployed for production, the model may eventually start to degrade. Most often, performance in the ML. may be used to mean statistical performance, be it accuracy, precision, recall, sensitivity, or specificity. When the model is trained on historical data, the model may perform excellently for any data with the same characteristics. However, as time progresses, the actual data characteristics may keep changing, and the model may not be aware of these changes at all. This causes model drift, i.e., degradation in model performance. For example, training a model to detect spam mail versus ham mail. The model performs well when deployed, however, eventually, the types of spam keep morphing, and hence the accuracy of the prediction comes down. The model drift could happen because of a concept drift or a data drift. In addition, monitoring prediction and feature drift without the right tools can be tedious. A data scientist or an ML engineer accountable for maintaining production models may have to continuously compare a selected window of live traffic of data with a baseline. When drift in model output is captured, the next step is to identify which features caused the drift. Most of the time, an input feature might have drifted a lot but it might not have caused a meaningful drift in the model output, because the feature has low importance in the model. Identifying the source of the drift involves assessing the underlying drift in features relative to their input importance.

Conventional methods for the model drift detection include broad categorization regarding when and where the drifts can be implemented i.e., for which fields it can be implemented. In yet another conventional method, the models use the basic and earlier discovered algorithms such as natural log-based analysis, probability distribution calculation, and the like. In yet another conventional method, training models are divided into synthetic data i.e., imaginary dataset and predictive model i.e., the analysis of the model which has already been predicted. Comparing the result of the predictive model with incoming data, the drift detection may be decided. This model is trained on imaginary dataset. Another conventional method describes calculating a difference of two datasets such as percentage of the records on variable scoring sample and same variable in training sample. This method is tested on offline training dataset and online scoring system based on the latest dataset, and not on the live. The result of the difference is compared with natural log of the percentage of variable scoring dataset sample and then the drift is analyzed. However, the conventional method may not provide how much drift has been observed between the offline and online dataset. Yet another conventional method describes detecting the drift after the predictive results of the model. There is no update of any drift detection after receiving the new training dataset. With the new dataset, the conventional method only retrains the model and modifies the predictive results.

There is, therefore, a need in the art to provide systems and methods for detecting drift in supervised and unsupervised machine learning models, that can overcome the shortcomings of the existing prior art.

OBJECTS OF THE PRESENT DISCLOSURE

Some of the objects of the present disclosure, which at least one embodiment herein satisfies are as listed herein below.

An object of the present disclosure is to provide systems and methods for detecting drift in supervised and unsupervised machine learning models.

Another object of the present disclosure is to provide systems and methods for obtaining a result of a drift in a model based on various methods and characteristics of the model being changed as per a change in time.

An object of the present disclosure is to provide systems and methods for detecting a drift and providing a cause for the detected drift, based on analysis and results from past dataset and present dataset.

Another object of the present disclosure is to improve drift detection with different types of drifts like abrupt, gradual, incremental, or reoccurring, as data drift is a change in statistical properties of data with the passage of time.

Another object of the present disclosure is to enable data-drift detection for a variation in production data from the data that was used to test and validate the model before deploying the model.

Yet another object of the present disclosure is to provide systems and methods for identifying a source of the drift which involves assessing the underlying drift in features relative to the input importance.

SUMMARY

This section is provided to introduce certain objects and aspects of the present invention in a simplified form that are further described below in the detailed description. This summary is not intended to identify the key features or the scope of the claimed subject matter.

In an aspect, the present disclosure relates to a system for detecting a drift in supervised and unsupervised machine learning (ML) models. The system retrieves current dataset corresponding to an output of one or more supervised Machine Learning (ML) models and one or more unsupervised ML models. Further, the system segregates the current dataset based on a requirement of at least one drift detection model of a plurality of drift detection models. Furthermore, the system applies the at least one drift detection model of the plurality of drift detection models to the segregated dataset, to generate one or more predictive results corresponding to the current dataset. Additionally, the system determines one or more errors in the one or more predictive results, by comparing the one or more predictive results to one or more reference values associated with the current dataset. Furthermore, the system detects the drift in the one or more supervised ML models and the one or more unsupervised ML models based on the determined one or more errors being greater than a threshold value. The one or more supervised ML models and the one or more unsupervised ML models are corrected, based on the detected drift.

In an embodiment, to apply the at least one drift detection model of the plurality of drift detection models, the system calculates a sliding window probability of the current dataset. Further, the system tracks maximum probability values in the current dataset, based on the calculated sliding window probability. Furthermore, the system determines one or more correct prediction results from the maximum probability values. Additionally, the system detects the drift in the one or more supervised ML models and the one or more unsupervised ML models based on the one or more correct prediction results being below a pre-defined maximum probability value and a pre-defined probability threshold value.

In an embodiment, to apply the at least one drift detection model of the plurality of drift detection models, the system trains the plurality of drift detection models, using a historical dataset and the current dataset. Further, the system increments a counter, when the one or more errors are determined in the one or more predictive results from the plurality of drift detection models trained using the historical dataset. Furthermore, the system decrements the counter, when the one or more errors are determined in the one or more predictive results from the plurality of drift detection models trained using the current dataset. Additionally, the system detects the drift in the one or more supervised ML models and the one or more unsupervised ML models based on a count in the counter being greater than a predefined count threshold value.

In an embodiment, to apply the at least one drift detection model of the plurality of drift detection models, the system segregates the current dataset into a training dataset and a test dataset. Further, the system trains the plurality of drift detection models using the training dataset. Furthermore, the system generates the one or more predictive results using the test dataset. Further, the system calculates a first error rate from one or more errors in the generated one or more predictive results corresponding to the test dataset. Additionally, the system shuffles the current dataset and segregate the shuffled dataset into training dataset and test dataset, in response to calculating the first error rate. Further, the system trains the plurality of drift detection models using the training dataset associated with the shuffled dataset. Furthermore, the system generates the one or more predictive results using the test dataset associated with the shuffled dataset. Further, the system calculates a second error rate from one or more errors in the generated one or more predictive results corresponding to the test dataset associated with the shuffled dataset. Additionally, the system detects the drift in the one or more supervised ML models and the one or more unsupervised ML models, based on a difference between the first error rate and the second error rate being greater than a pre-defined error rate threshold value.

In an embodiment, to apply the at least one drift detection model of the plurality of drift detection models, the system segregates the current dataset into a first data set and a second dataset, and segregate each of the first dataset and second dataset into first partition data and the second partition data. Further, the system calculates a kernel-based distribution from the first partition data. Furthermore, the system calculates a log probability between the second partition data of the first dataset and the second dataset. Additionally, the system determines a difference in the kernel-based distribution from the calculated log probability.

In an embodiment, to apply the at least one drift detection model of the plurality of drift detection models, the system creates an artificial label. Further, the system assigns a '1' value to a first dataset of the current dataset and '−1' value to a second dataset of the current dataset. Furthermore, the system classifies the first dataset and the second dataset using a binary classifier built on the current dataset with k fold cross validation, based on the assigned value. Further, the system determines an accuracy score for the classification of the first dataset and the second dataset using the binary classifier. Further, the system detects the drift in the one or more supervised ML models and the one or more unsupervised ML models based on the accuracy score being greater than a pre-defined accuracy threshold value.

In an embodiment, the current dataset is segregated to determine a data point in the current dataset based on detecting the drift in the one or more supervised ML models and the one or more unsupervised ML models.

In an embodiment, the detected drift is a statistic indicative of the drift in the one or more supervised ML models and the one or more unsupervised ML models.

In an embodiment, the plurality of drift detection models for detecting the drift in the one or more supervised ML models comprises at least one of a Fast Hoeffding Drift Detection Method (FHDDM), a Paired Learner (PL), and a Shuffling and Resampling (SR).

In an embodiment, the plurality of drift detection models for detecting the drift in the one or more unsupervised ML models comprises at least one of a KullbackLeibler (KL) Divergence, a Kolmogorov Smirnov Test (KS), a Cramer Von Mises Test (CVM), an Anderson Darling Test (AD), a Kernel Based Distribution Discrepancy Test (KBDD), and a Virtual Classifier (VC).

In another aspect, the present disclosure provides a method for detecting a drift in supervised and unsupervised Machine Learning (ML) models. The method includes retrieving current dataset corresponding to an output of one or more supervised ML models and one or more unsupervised ML models. Further, the method includes segregating the current dataset based on a requirement of at least one drift detection model of a plurality of drift detection models. Further, the method includes applying the at least one drift detection model of the plurality of drift detection models to the segregated dataset to generate one or more predictive results corresponding to the current dataset. Further, the method includes determining one or more errors in the one or more predictive results, by comparing the one or more predictive results to one or more reference values associated with the current dataset. Further, the method includes detecting the drift in the one or more supervised ML models and the one or more unsupervised ML models based on the determined one or more errors being greater than a threshold value. The one or more supervised ML models and the one or more unsupervised ML models are corrected based on the detected drift.

In another aspect, the present disclosure provides a User Equipment (UE) for detecting a drift in supervised and unsupervised Machine Learning (ML) models. The UE retrieves current dataset corresponding to an output of one or more supervised ML models and one or more unsupervised ML models. Further, the UE segregates the current dataset based on a requirement of at least one drift detection model of a plurality of drift detection models. Furthermore, the UE apply the at least one drift detection model of the plurality of drift detection models to the segregated dataset to generate one or more predictive results corresponding to the current dataset. Further, the UE determines one or more errors in the one or more predictive results, by comparing the one or more predictive results to one or more reference values associated with the current dataset. Furthermore, the UE detects the drift in the one or more supervised ML models and the one or more unsupervised ML models based on the determined one or more errors being greater than a threshold value. The one or more supervised ML models and the one or more unsupervised ML models are corrected, based on the detected drift.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

The foregoing shall be more apparent from the following more detailed description of the disclosure.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Embodiments of the present disclosure provide systems and methods for detecting a drift in supervised and unsupervised machine learning models. The present disclosure provides systems and methods for detecting the drift and providing a cause for the detected drift, based on analysis and results of past dataset and present dataset. The present disclosure facilitates improvement in drift detection with different types of drift like abrupt, gradual, incremental, or reoccurring, as data drift is a change in statistical properties of data with passage of time. The present disclosure enables data-drift detection for a variation in the production data from the data that was used to test and validate the model before deploying the model. The present disclosure provides systems and methods for identifying the source of the drift which involves assessing the underlying drift in features relative to the input importance.

Figure 1:
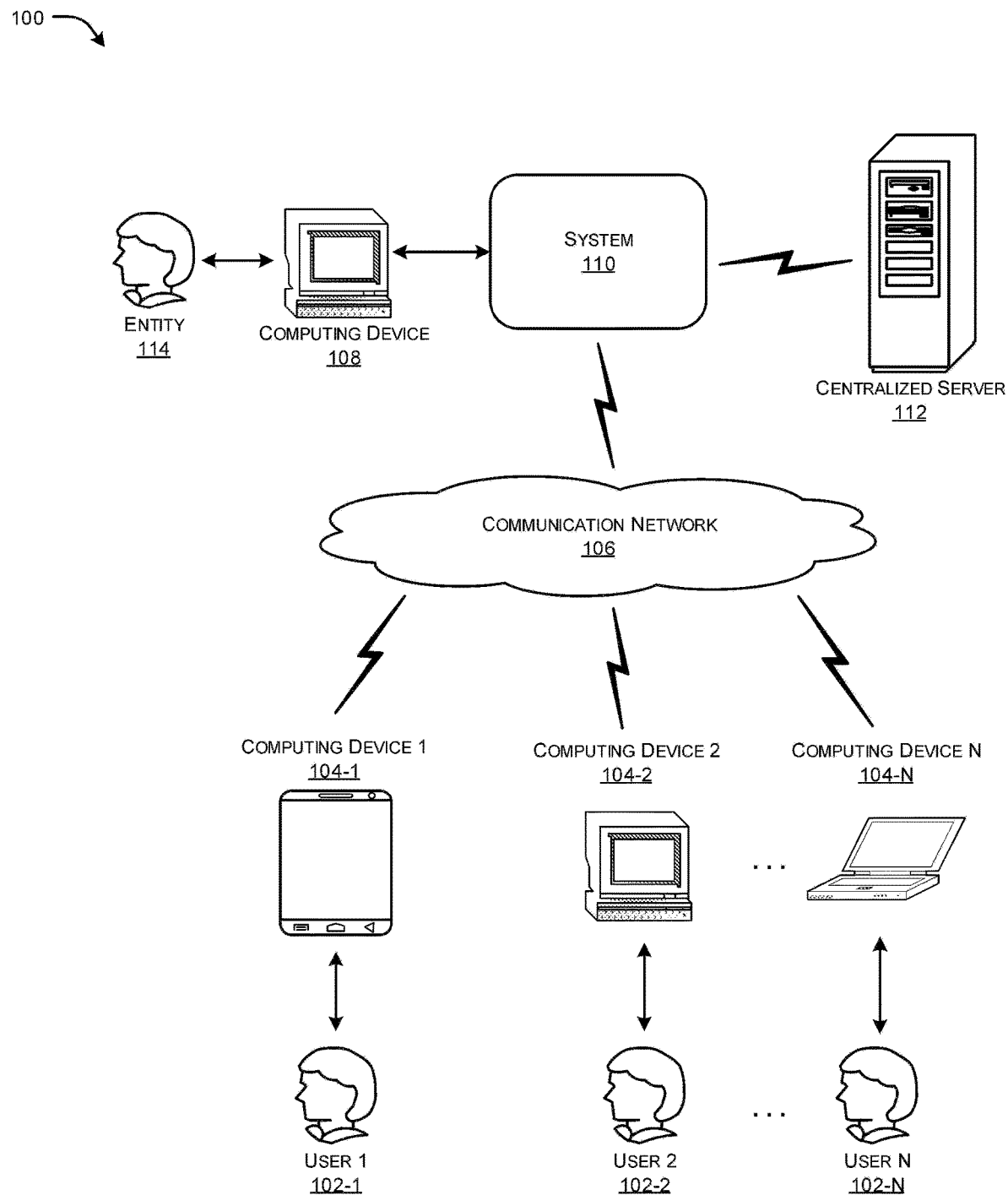
FIG. 1 illustrates an exemplary network architecture in which or with which a proposed system of the present disclosure may be implemented, in accordance with an embodiment of the present disclosure.

Referring to FIG. 1 that illustrates an exemplary network architecture for a drift detection system (100) (also referred to as network architecture (100)) in which or with which a system (110) of the present disclosure may be implemented, in accordance with an embodiment of the present disclosure. As illustrated, the network architecture (100) may be equipped with the system (110) for detecting a drift in supervised and unsupervised machine learning (ML) models. For example, supervised and unsupervised ML models may determine at least one of, but not limited to a shopping, a non-shopping, a churn, and the like, behaviour of users (102-1, 102-2 ... 102-N) (individually referred to as the user (102) and collectively referred to as the users (102)) associated with one or more first computing devices (104-1, 104-2 ... 104-N) (individually referred to as the first computing device (104) and collectively referred to as the first computing devices (104)). The system (110) may be further operatively coupled to a second computing device (108) associated with an entity (114). The entity (114) may include a company, an organisation, a university, a lab facility, a business enterprise, a defence facility, an e-commerce platform, or any other secured facility. In some implementations, the system (110) may also be associated with the second computing device (108). Further, the system (110) may be communicatively coupled to the one or more first computing devices (104) via a communication network (106).

The system (110) may be coupled to a centralized server (112). The centralized server (112) may also be operatively coupled to the one or more first computing devices (104) and the second computing device (108) through the communication network (106) For instance, the centralized server (112) may be associated with the entity (114). The centralized server (112) may be used by a retail customer for browsing e-commerce platform through the first computing devices (104). The centralized server (112) may include and process, for example, e-commerce platform data such as customer churn data, customer behaviour data, average transaction amount, average time gap between visits, average number of searches per session, and number of service issues, average number of calls or emails for issue resolution, and/or number of online payment issues, and the like.

In an embodiment, a drift may be a change in statistical properties of data with passage of time. For example, the type of drift change which may occur over a period may include, but not be limited to, an abrupt drift, a gradual drift, an incremental drift, a reoccurring drift, and the like. For example, the abrupt drift may be a drift in which changes occur within a short time and are easier to detect. The gradual drift may be a drift in which new concept replaces the old concept gradually over time. Intermediate concepts may be instances of old concept or new concept being faced. The incremental drift may be a drift in which an existing concept incrementally changes to a new concept. The reoccurring drift may be a drift in which an old concept may re-occur after some time.

In an embodiment, the system (110) may retrieve a current dataset corresponding to an output of one or more supervised ML models and one or more unsupervised ML models. In an embodiment, the system (110) may segregate the current dataset based on a requirement of at least one drift detection model of a plurality of drift detection models. In an embodiment, the current dataset may be segregated to determine a data point in the current dataset based on detecting the drift in the one or more supervised ML models and the one or more unsupervised ML models.

In an embodiment, the system (110) may apply the at least one drift detection model of the plurality of drift detection models to the segregated dataset, to generate one of more predictive results corresponding to the current dataset. In an embodiment, the plurality of drift detection models for detecting drift in the one or more supervised ML models may include, but not be limited to, a Fast Hoeffding Drift Detection Method (FHDDM), a Paired Learner (PL), a Shuffling and Resampling (SR), and the like. In an embodiment, the plurality of drift detection models for detecting drift in the one or more unsupervised ML models may include, but not be limited to, a Kullback Leibler (KL) Divergence, a Kolmogorov Smirnov Test (KS), a Cramer Von Mises Test (CVM), an Anderson Darling Test (AD), a Kernel Based Distribution Discrepancy Test (KBDD), a Virtual Classifier (VC), and the like.

In an embodiment, the system (110) may determine one or more errors in the one or more predictive results, by comparing the one or more predictive results to one or more reference values associated with the current dataset. In an embodiment, the system (110) may detect the drift in the one or more supervised ML models and the one or more unsupervised ML models based on the determined one or more errors being greater than a threshold value. The one or more supervised ML models and the one or more unsupervised ML models may be corrected based on the detected drift. In an embodiment, the detected drift may be a statistic indicative of the drift in the one or more supervised ML models and the one or more unsupervised ML models.

In an embodiment, to apply the at least one drift detection model of the plurality of drift detection models, the system (110) may calculate a sliding window probability of the current dataset. In an embodiment, the system (110) may track maximum probability values in the current dataset based on the calculated sliding window probability.

In an embodiment, the system (110) may determine one or more correct prediction results from the maximum probability values. In an embodiment, the system (110) may detect the drift in the one or more supervised ML models and the one or more unsupervised ML models based on the one or more correct prediction results being below a pre-defined maximum probability value and a pre-defined probability threshold value.

In an embodiment, to apply the at least one drift detection model of the plurality of drift detection models, the system (110) may train the plurality of drift detection models using a historical dataset and the current dataset. In an embodiment, the system (110) may increment a counter, when the one or more errors are determined in the one or more predictive results from the plurality of drift detection models trained using the historical dataset. In an embodiment, the system (110) may decrement the counter, when the one or more errors are determined in the one or more predictive results from the plurality of drift detection models trained using the current dataset. In an embodiment, the system (110) may detect the drift in the one or more supervised ML models and the one or more unsupervised ML models, when a count in the counter is greater than a predefined count threshold value.

In an embodiment, for applying the at least one drift detection model of the plurality of drift detection models, the system (110) may segregate the current dataset into training dataset and test dataset. In an embodiment, the system (110) may train the plurality of drift detection models using the training dataset. In an embodiment, the system (110) may generate the one or more predictive results using the test dataset. In an embodiment, the system (110) may calculate a first error rate from one or more errors in the generated one or more predictive results corresponding to the test dataset. In an embodiment, the system (110) may shuffle the current dataset and segregate the shuffled dataset into training dataset and test dataset upon calculating the first error rate. In an embodiment, the system (110) may train the plurality of drift detection models using the training dataset associated with the shuffled dataset. In an embodiment, the system (110) may generate the one or more predictive results using the test dataset associated with the shuffled dataset. In an embodiment, the system (110) may calculate a second error rate from one or more errors in the generated one or more predictive results corresponding to the test dataset associated with the shuffled dataset. In an embodiment, the system (110) may detect the drift in the one or more supervised ML models and the one or more unsupervised ML models, when a difference between the first error rate and the second error rate is greater than a predefined error rate threshold value.

In an embodiment, for applying the at least one drift detection model of the plurality of drift detection models, the system (110) may segregate the current dataset into first dataset and second dataset, and segregate each of the first dataset and second dataset into first partition data and second partition data. In an embodiment, the system (110) may calculate a kernel-based distribution from the first partition data. In an embodiment, the system (110) may calculate a log probability between the second partition data of the first dataset and the second dataset. In an embodiment, the system (110) may determine a difference in the kernel-based distribution from the calculated log probability.

In an embodiment, for applying the at least one drift detection model of the plurality of drift detection models, the system (110) may create an artificial label. In an embodiment, the system (110) may assign a '1' value to a first dataset of the current dataset and '−1' value to a second dataset of the current dataset. In an embodiment, the system (110) may classify the first dataset and the second dataset using a binary classifier built on the current data with k fold cross validation, based on the assigned value. In an embodiment, the system (110) may determine an accuracy score for the classification of the first dataset and the second dataset using the binary classifier. In an embodiment, the system (110) may detect the drift in the one or more supervised ML models and the one or more unsupervised ML models, when the accuracy score is greater than a pre-defined accuracy threshold value.

In an embodiment, the system (110) may be a System on Chip (SoC) system but not limited to the like. In another embodiment, an onsite data capture, storage, matching, processing, decision-making, and actuation logic may be coded using Micro-Services Architecture (MSA) but not limited to it. A plurality of microservices may be containerized and may be event based in order to support portability.

In an embodiment, the network architecture (100) may be modular and flexible to accommodate any kind of changes in the system (110) as proximate processing may be acquired towards detecting drift in supervised and unsupervised ML models. The system (110) configuration details can be modified on the fly.

In an embodiment, the system (110) may be remotely monitored and the data, application, and physical security of the system (110) may be fully ensured. In an embodiment, the data may be collected meticulously and deposited in a cloud-based data lake to be processed to extract actionable insights. Therefore, the aspect of predictive maintenance can be accomplished.

In an exemplary embodiment, the communication network (106) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. The communication network (106) may include, by way of example but not limitation, one or more of a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, some combination thereof.

In another exemplary embodiment, the centralized server (112) may include or comprise, by way of example but not limitation, one or more of a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

In an embodiment, the one or more first computing devices (104) and the second computing device (108) may communicate with the system (110) via set of executable instructions residing on any operating system. In an embodiment, the one or more first computing devices (104) and the second computing device (108) may include, but not limited to, any electrical, electronic, electro-mechanical or an equipment or a combination of one or more of the above devices such as mobile phone, smartphone, Virtual Reality (VR) devices, Augmented Reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen, receiving devices for receiving any audio or visual signal in any range of frequencies and transmitting devices that can transmit any audio or visual signal in any range of frequencies. It may be appreciated that the one or more first computing devices (104) and the second computing device (108) may not be restricted to the mentioned devices and various other devices may be used. A smart computing device may be one of the appropriate systems for storing data and other private/sensitive information.

Figure 2:
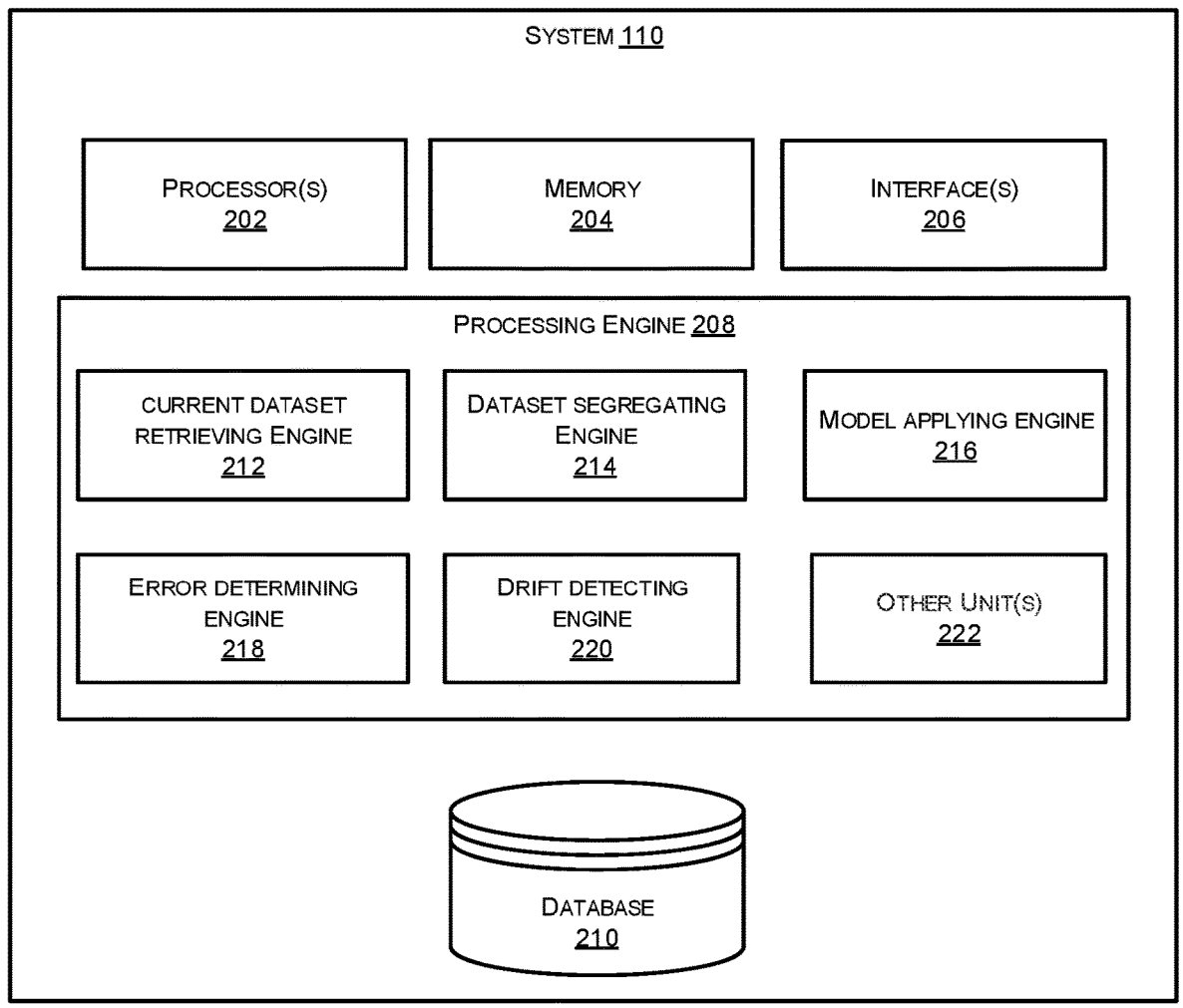
FIG. 2 illustrates an exemplary block diagram representation of a proposed system for detecting a drift in supervised and unsupervised machine learning models, in accordance with an embodiment of the present disclosure.

FIG. 2 illustrates an exemplary block diagram representation of a proposed system (110) for detecting a drift in supervised and unsupervised ML models, in accordance with an embodiment of the present disclosure. In an aspect, the system (110) may include one or more processor(s) (202). The one or more processor(s) (202) may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (110). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as Random-Access Memory(RAM), or non-volatile memory such as an Erasable Programmable Read-Only Memory EPROM, flash memory, and the like.

In an embodiment, the system (110) may include an interface(s) (206). The interface(s) (206) may comprise a variety of interfaces, for example, interfaces for data input and output devices, referred to as input/Output(I/O) devices, storage devices, and the like. The interface(s) (206) may facilitate communication to or from the system (110). The interface(s) (206) may also provide a communication pathway for one or more components of the system (110). Examples of such components include, but are not limited to, processing unit/engine(s) (208) and a database (210).

The processing unit/engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor-executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110) may comprise the machine-readable storage medium storing the instructions and the processing resource to execute the instructions, or the machine-readable storage medium may be separate but accessible to the system (110) and the processing resource. In other examples, the processing engine(s) (208) may be implemented by electronic circuitry.

The processing engine (208) may include one or more engines selected from any of a current dataset retrieving engine (212), a dataset segregating engine (214), a model applying engine (216), an error determining engine (218), a drift detecting engine (220), and other engines/units (222).

In an embodiment, the current dataset retrieving engine (212) may retrieve current dataset corresponding to an output of one or more supervised ML models and one or more unsupervised ML models. In an embodiment, the dataset segregating engine (214) may segregate the current dataset based on a requirement of at least one drift detection model of a plurality of drift detection models. In an embodiment, the current dataset may be segregated to determine a data point in the current dataset based on detecting the drift in the one or more supervised ML models and the one or more unsupervised ML models.

In an embodiment, the model applying engine (216) may apply the at least one drift detection model of the plurality of drift detection models to the segregated dataset to generate one or more predictive results corresponding to the current dataset. In an embodiment, the plurality of drift detection models for detecting the drift in the one or more supervised ML models may include, but not be limited to, a Fast Hoeffding Drift Detection Method (FHDDM), a Paired Learner (PL), a Shuffling and Resampling (SR), and the like. In an embodiment, the plurality of drift detection models for detecting the drift in the one or more unsupervised ML models may include, but not be limited to, a KullbackLeibler (KL) Divergence, a Kolmogorov Smirnov Test (KS), a Cramer Von Mises Test (CVM), an Anderson Darling Test (AD), a Kernel Based Distribution Discrepancy Test (KBDD), a Virtual Classifier (VC), and the like.

In an embodiment, the error determining engine (218) may determine one or more errors in the one or more predictive results by comparing the one or more predictive results to one or more reference values associated with the current dataset. In an embodiment, the drift detecting engine (220) may detect a drift in the one or more supervised ML models and the one or more unsupervised ML models based on the determined one or more errors being greater than a threshold value. The one or more supervised ML models and the one or more unsupervised ML models may be corrected based on the detected drift. In an embodiment, the detected drift may be a statistic indicative of drift in the one or more supervised ML models and the one or more unsupervised ML models.

Figure 3A:
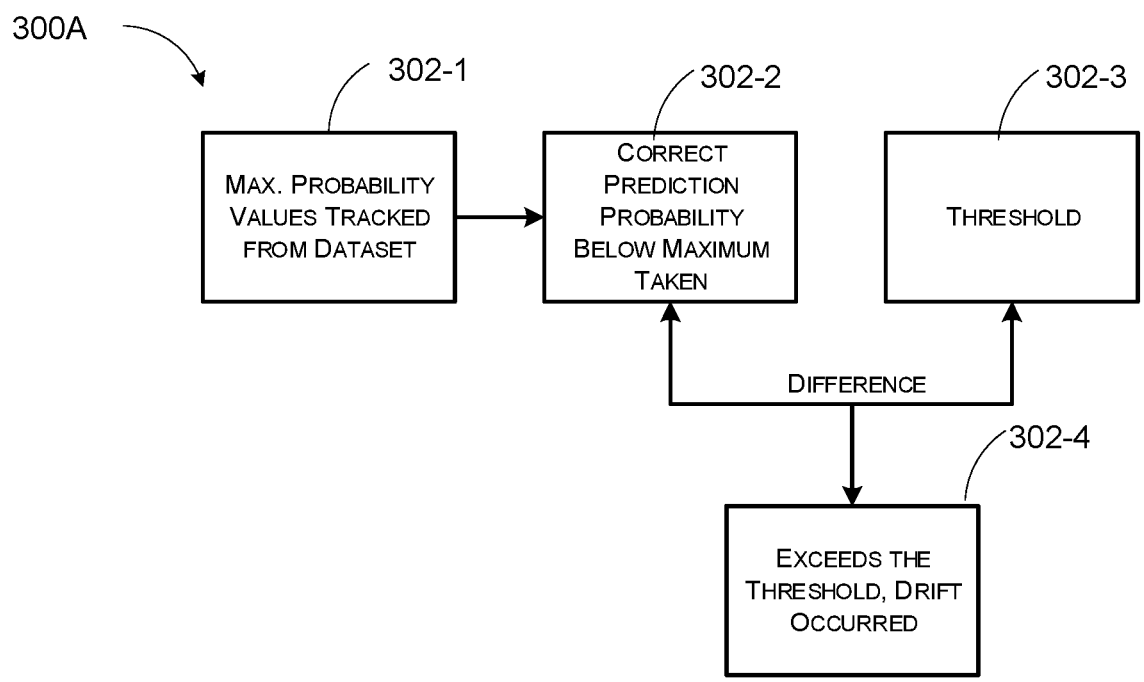
FIG. 3A illustrates an exemplary flow diagram representation of a Fast Hoeffding Drift Detection Method (FHDDM) using a drift detection model, in accordance with an embodiment of the present disclosure.

FIG. 3A illustrates an exemplary flow diagram representation of a Fast Hoeffding Drift Detection Method (FHDDM) (300A) using a drift detection model, in accordance with an embodiment of the present disclosure. For example, the FHDDM (300A) may be used for calculating a sliding window probability of correct prediction.

At step (302-1), the FHDDM (300A) may include tracking maximum probability values from dataset. At steps (302-2), (302-3), and (302-4), the FHDDM (300A) may include determining a drift when the correct prediction probability drops below a maximum prediction probability and the difference in probabilities exceeds a threshold defined by the FHDDM (300A).

In an embodiment, the threshold may be defined using equation 1 below:

$$Sqrt(\ln(1/\delta)/(2*n)) \quad \text{Equation 1}$$

In the above equation 1, the term 'δ' may refer to low probability threshold value, and 'n' may refer to a window size.

Figure 3B:
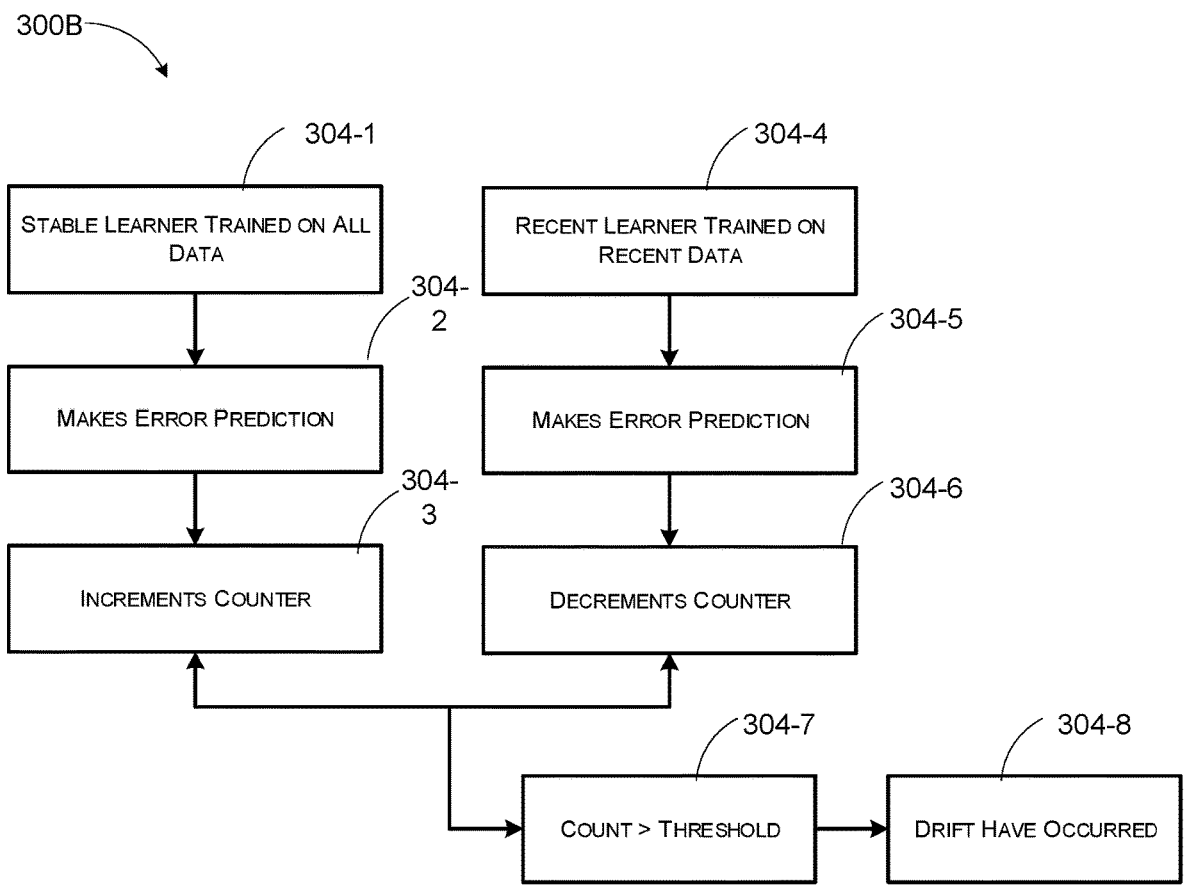
FIG. 3B illustrates an exemplary flow diagram representation of a Paired Learner (PL) method, in accordance with an embodiment of the present disclosure.

FIG. 3B illustrates an exemplary flow diagram representation of a Paired Learner (PL) method (300B) using a drift detection model, in accordance with an embodiment of the present disclosure. For example, a PL may be categorized into two parts such as a stable learner and recent learner.

At steps (304-1), (304-2), and (304-3), the PL method (300B) may include training a stable learner on all data and incrementing a counter when the stable learner makes an error in prediction. At steps (304-4), (304-5), and (304-6), the PL method (300B) may include training a recent learner on recent data, and decrementing the counter when the recent learner outputs an error in prediction. At step (304-7), the PL method (300B) may include determining if the count is above the threshold value, and at step (304-8), the PL method (300B) may include determining the drift.

Figure 3C:
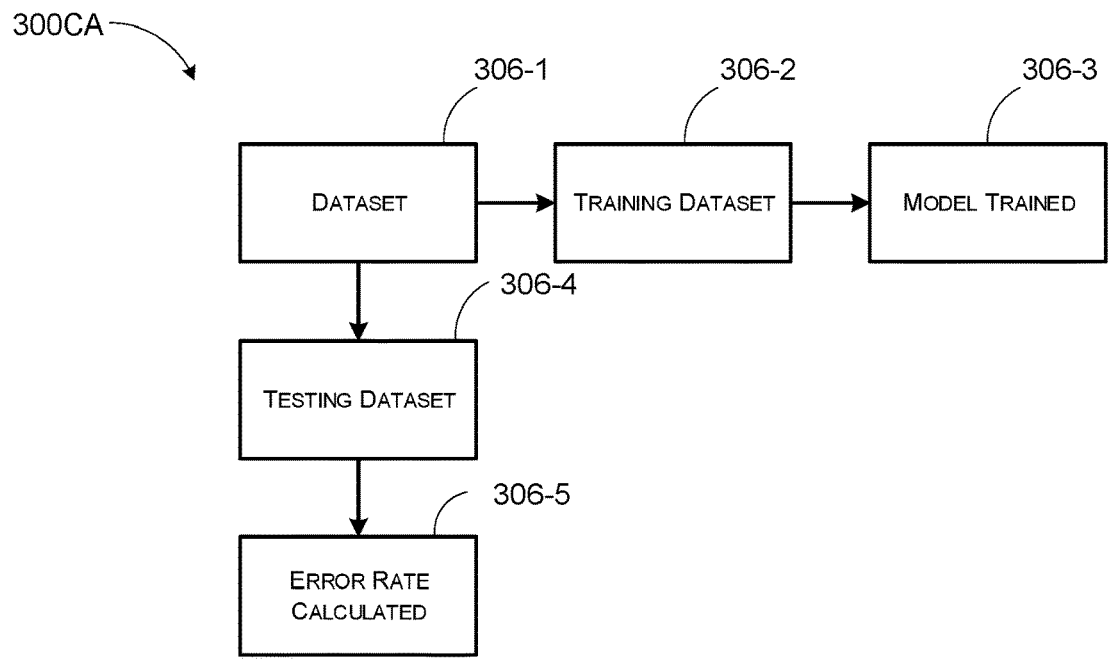
FIGS. 3CA, 3CB, and 3D illustrate exemplary flow diagram representations of Shuffling and Resampling (SR) method, using a drift detection model, for order data and shuffled data, respectively, and drift determining method based on the order data and shuffled data, in accordance with embodiments of the present disclosure.
Figure 3C:
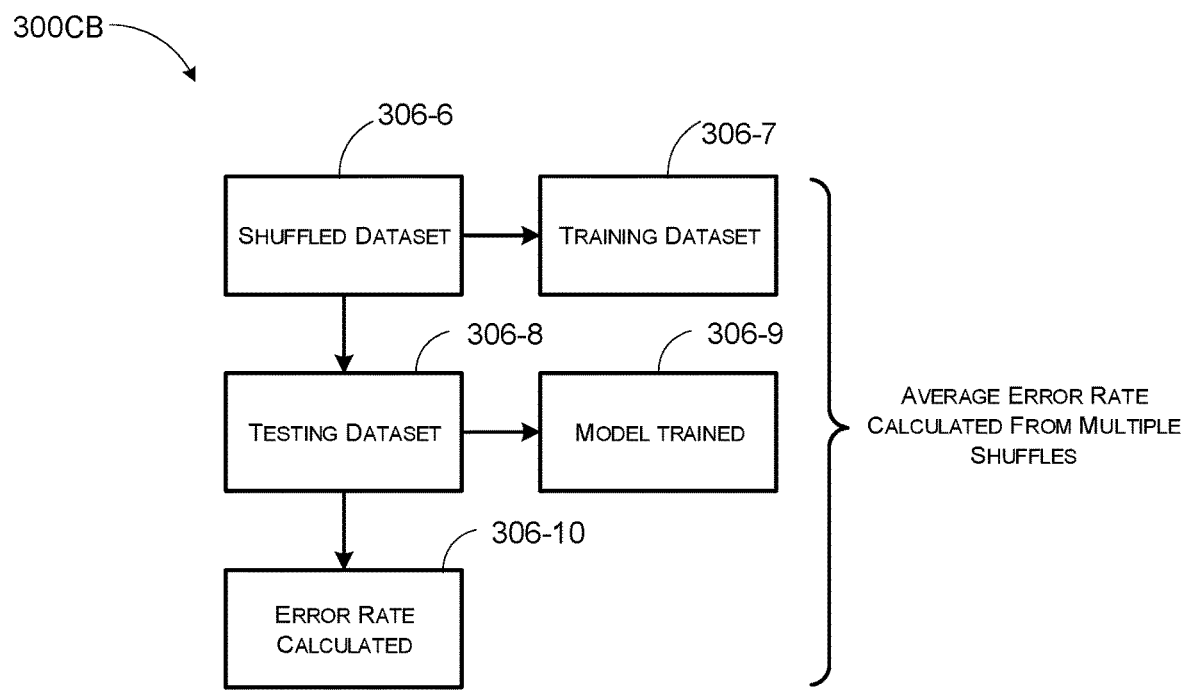
Figure 3D:
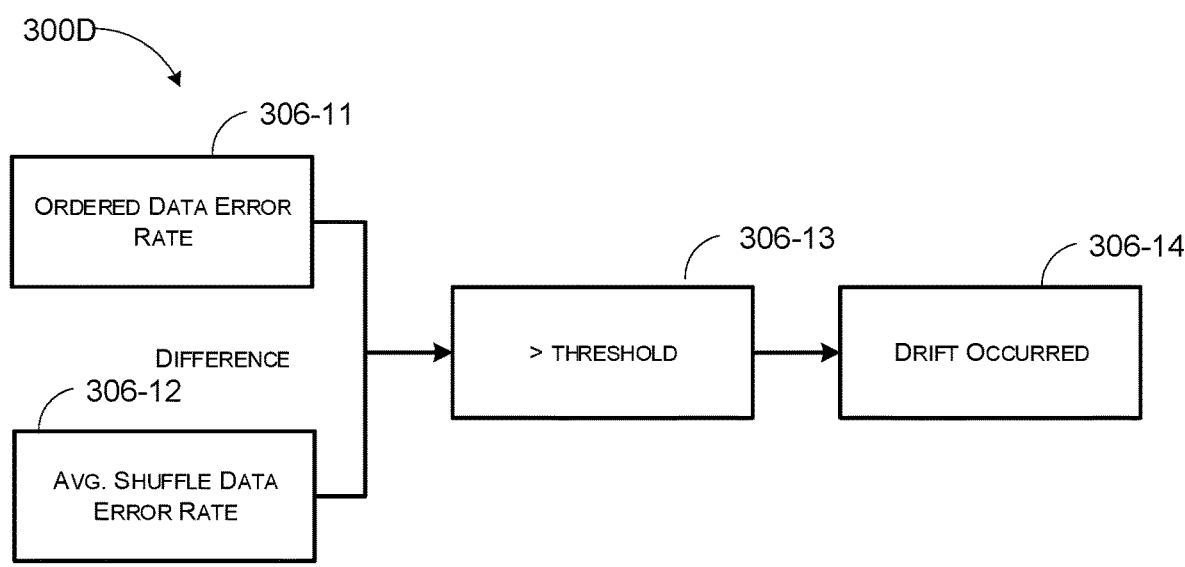
FIG. 3E illustrates an exemplary flow diagram representation of a method for Kernel Based Distribution Discrepancy (KBDD) test using a drift detection model, in accordance with an embodiment of the present disclosure.

FIGS. 3CA, 3CB, and 3D illustrate exemplary flow diagram representations of Shuffling and Resampling (SR) method (300CA) and (300CB), using a drift detection model, for order data and shuffled data, respectively, and a drift determining method (300D) based on the order data and shuffled data, in accordance with embodiments of the present disclosure.

At step (306-1), the method (300CA) may include splitting the dataset into train and test sets. The split location is where drift is assumed to occur. At steps (306-2) and (306-3), the method (300CA) may include training a model on the training data. At steps (306-4) and (306-5), the method (300CA) may include calculating an error rate on test set.

At steps (306-6), (306-7), and (306-8), the method (300CB) may include shuffling and splitting the data into train and test sets. At steps (306-9) and (306-10), the method (300CB) may include training the model and calculating the error from the test set, respectively. Average error rate may be calculated from multiple such shuffles.

At steps (306-11), (306-12), and (306-13) the method (300D) may include determining the drift, if the difference between ordered data error rate and average shuffled data error rate is above a threshold.

In an embodiment, unsupervised drift detection techniques although always applicable for unsupervised models are also frequently effective for supervised ML models. For supervised drift detection, there may be a need for an actual label soon after the deployed model has made the prediction. In many scenarios this is not feasible. In such cases, the only option may be to use unsupervised drift detection. The algorithms used may be based on two datasets such as reference data which is collected right after model deployment and is the most recent data, drift change detected is sharp, and sliding window in which one data set corresponds to the first half window and the other corresponds to the second half window, drift change detected is gradual.

Some referenced algorithms may include, but are not limited to, KullbackLeibler (KL) divergence, Kolmogorov Smirnov Test (KS), Cramer Von Mises Test (CVM), Anderson Darling Test (AD), Kernel Based Distribution Discrepancy Test (KBDD), Virtual Classifier (VC), and the like. The KL divergence may be asymmetric based on difference between distributions of reference data and recent data. The KL divergence may calculate average or maximum from the two versions. Large difference indicates drift. Further, the KS Test may be applicable for univariate data. It is based on maximum difference between cumulative distribution of reference data and recent data. Further, CVM test may be an aggregate weighted difference between cumulative distribution of reference data and recent data. More weights are given to the central region of distributions, applicable for univariate data. Further, the AD Test may be similar to the concept of CVM test, but more weights are assigned to tail region of distributions.

Figure 3E:
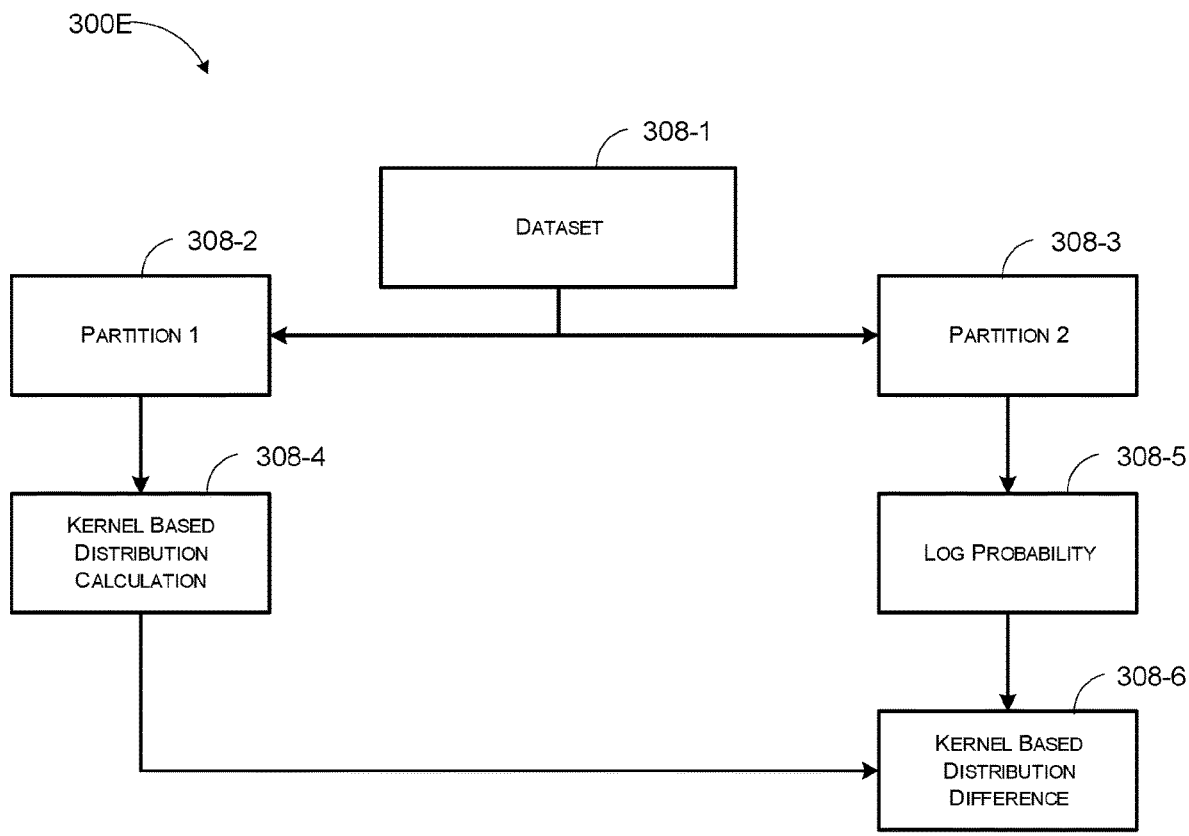

FIG. 3E illustrates an exemplary flow diagram representation of a method (300E) for Kernel Based Distribution Discrepancy (KBDD) test, in accordance with an embodiment of the present disclosure. At steps (308-1), (308-2), and (308-3), the method (300E) may include dividing the dataset into two parts for univariate data. At step (308-4), the method (300E) may include calculating a kernel-based distribution from first partition data. At step (308-5), the method (300E) may include determining a log probability between second partition of the first dataset and the second dataset. At step (308-6), the method (300E) may include determining a kernel-based distribution difference from the calculated log probability.

Further, in the Virtual Classifier (VC), the system (110) may create an artificial label. Label 1 may be assigned to one data set and −1 to the second data set. The system (110) may build a binary classifier with some of the data with 'k' fold cross validation. If the test accuracy is around, for example, '0.5', there is no drift. If the test accuracy is not significantly higher than 0.5, then the drift may not occur.

Figure 4:
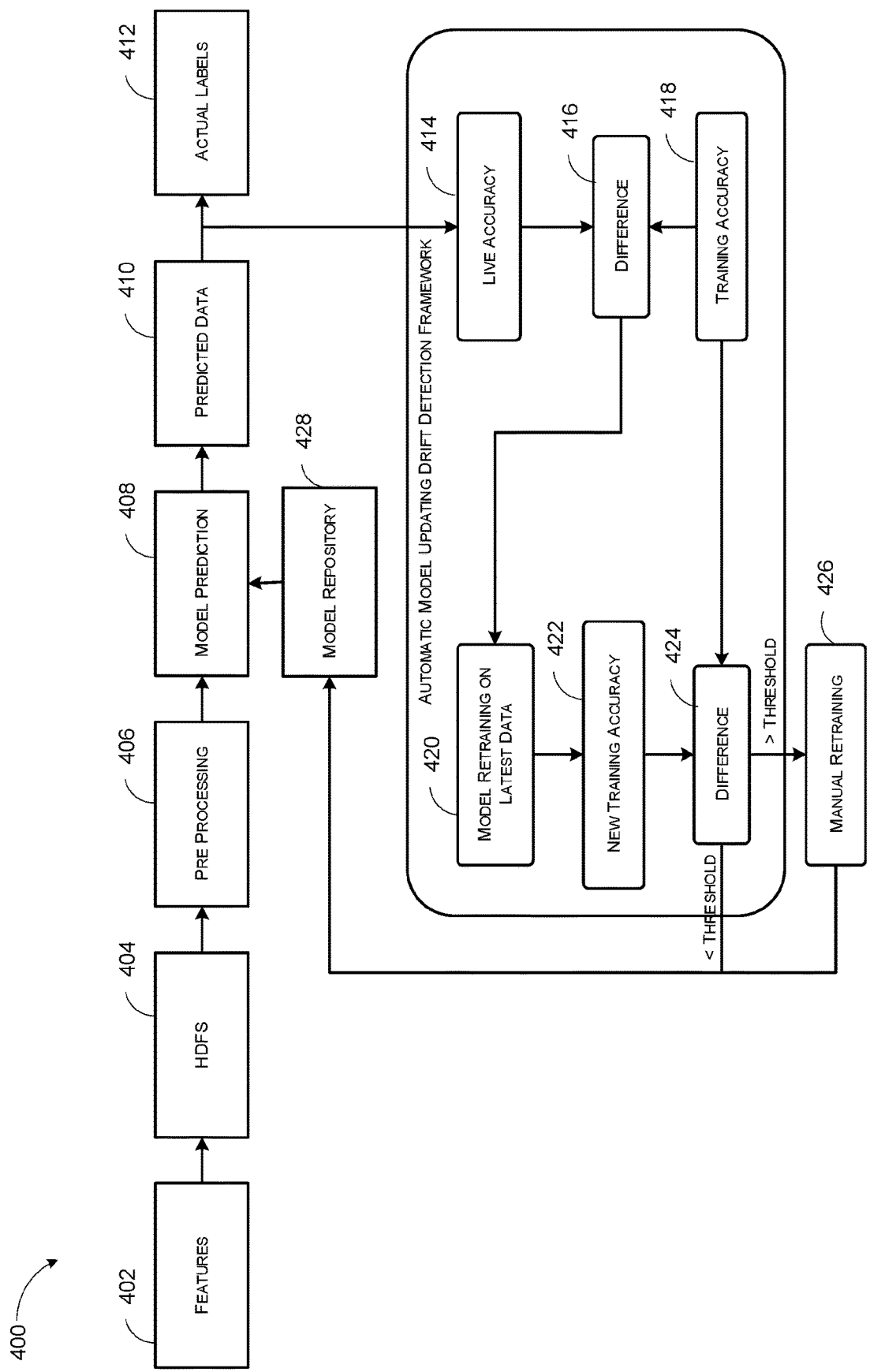
FIG. 4 illustrates an exemplary flow diagram representation of a method for model drift detection framework for big data predictive analytics under supervised learning using a drift detection model, in accordance with an embodiment of the present disclosure.

FIG. 4 illustrates an exemplary flow diagram representation of a method (400) for model drift detection framework for big data predictive analytics under supervised learning, in accordance with an embodiment of the present disclosure.

At step (402), the method (400) may include obtaining features. At step (404), the method (400) may include applying a Hadoop Distributed File System (HDFS) on the obtained features. At step (406), the method (400) may include performing pre-processing on the features. At step (408), the method (400) may include predicting drift using the model. At step (410), the method (400) may include outputting predicted data. At step (412), the method (400) may include outputting actual labels.

At step (414), the method (400) may include determining live accuracy of the predicted data. At steps (416) and (418), the method (400) may include determining difference between the live accuracy and training accuracy of the predicted data. At step (420), the method (400) may include retraining the model on the latest data. At step (422), the method (400) may include determining new training accuracy. At step (424), the method (400) may include determining difference of the new training accuracy with respect to the training accuracy. At step (426), the method (400) may include retraining the model manually, when the difference of the new training accuracy with respect to the training accuracy is greater than a threshold. At step (428), the method (400) may include automatic retraining of the model, when the difference of the new training accuracy with respect to the training accuracy is less than a threshold.

Figure 5:
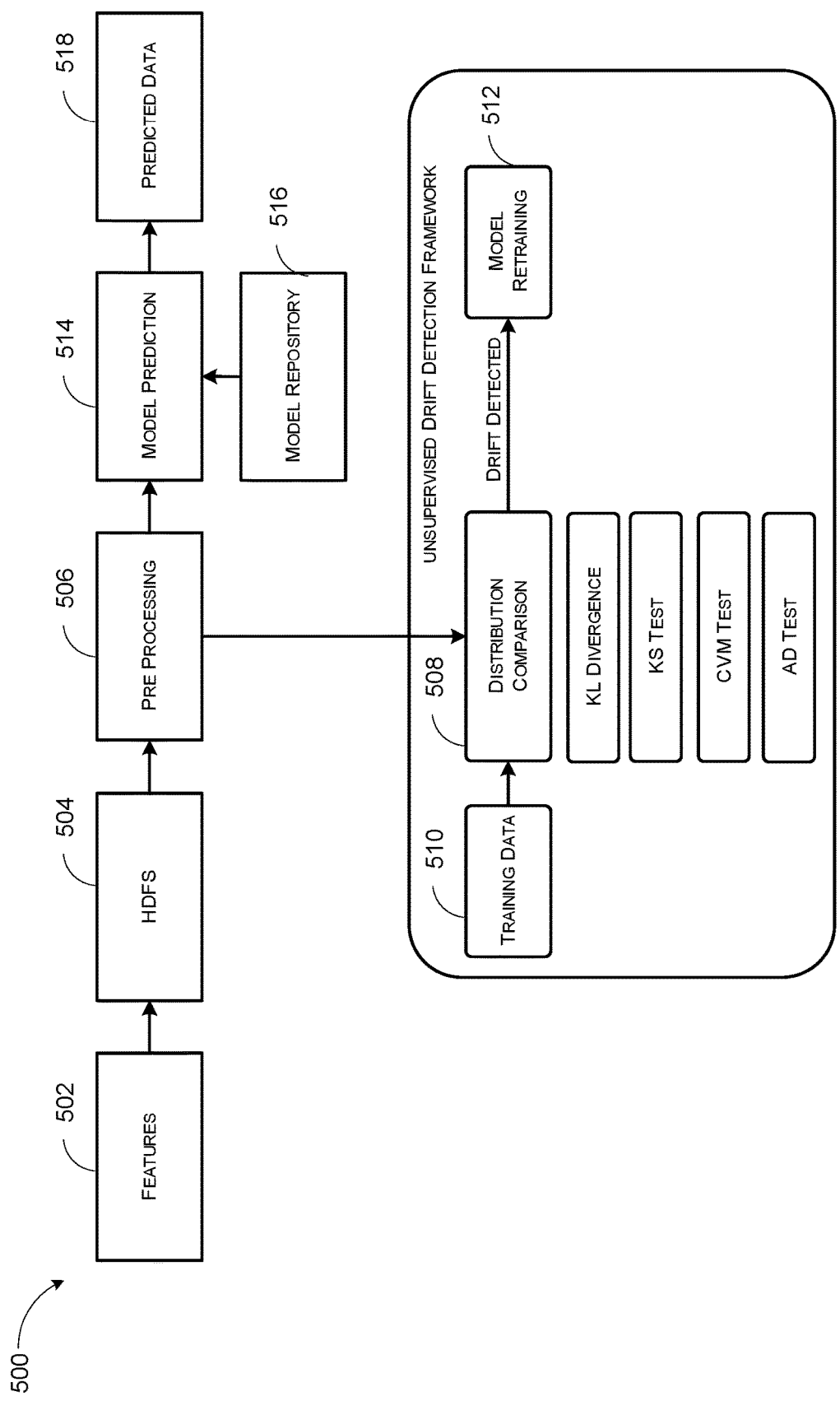
FIG. 5 illustrates an exemplary flow diagram representation of a method for model drift detection framework for big data predictive analytics under unsupervised learning, in accordance with an embodiment of the present disclosure.

FIG. 5 illustrates an exemplary flow diagram representation of method (500) for model drift detection framework for big data predictive analytics under unsupervised learning, in accordance with an embodiment of the present disclosure.

At step (502), the method (500) may include obtaining features. At step (504), the method (500) may include performing Hadoop Distributed File System (HDFS) on the obtained features. At step (506), the method (500) may include performing pre-processing on the features.

At steps (508) and (510), the method (500) may include distribution comparison based on at least one of KL divergence, KS test, CVM test, and AD test and using the training data. At step (512), the method (500) may include retraining of the model, when the drift is detected during the distribution comparison.

At steps (514) and (516), the method (500) may include predicting drift using the model from the model repository. At step (518), the method (500) may include outputting predicted data.

Exemplary Scenario

Unsupervised drift detection techniques may also be applicable for supervised models. As for supervised drift detection, an actual label is needed soon after the deployed model has made the prediction. However, in many scenarios, that may not be feasible. For example, considering detection of drift in a retail customer churn prediction model using nearest neighbour count algorithm. Considering an e-commerce company that has deployed a customer churn prediction, the features consist of average customer behavior in the past 6 months. The model predicts the probability of a customer churning within the next 1 month. The drift may be estimated in the customer data using nearest neighbor virtual classifier by considering some of the features such as average transaction amount, average time gap between visits, average number of searches per session, and number of service issues, average number of calls or emails for issue resolution, and/or number of online payment issues.

Solution steps: An artificial label is created. Label (e.g., 1) is assigned to one data set and (e.g., 0) to the second data set. AK-Nearest Neighbours (KNN) classifier model is trained on the combined dataset. If the average prediction probability is close to 0.5 i.e., poor predictability, there is no drift. As drift sets in, average probability goes up.

Figure 6:
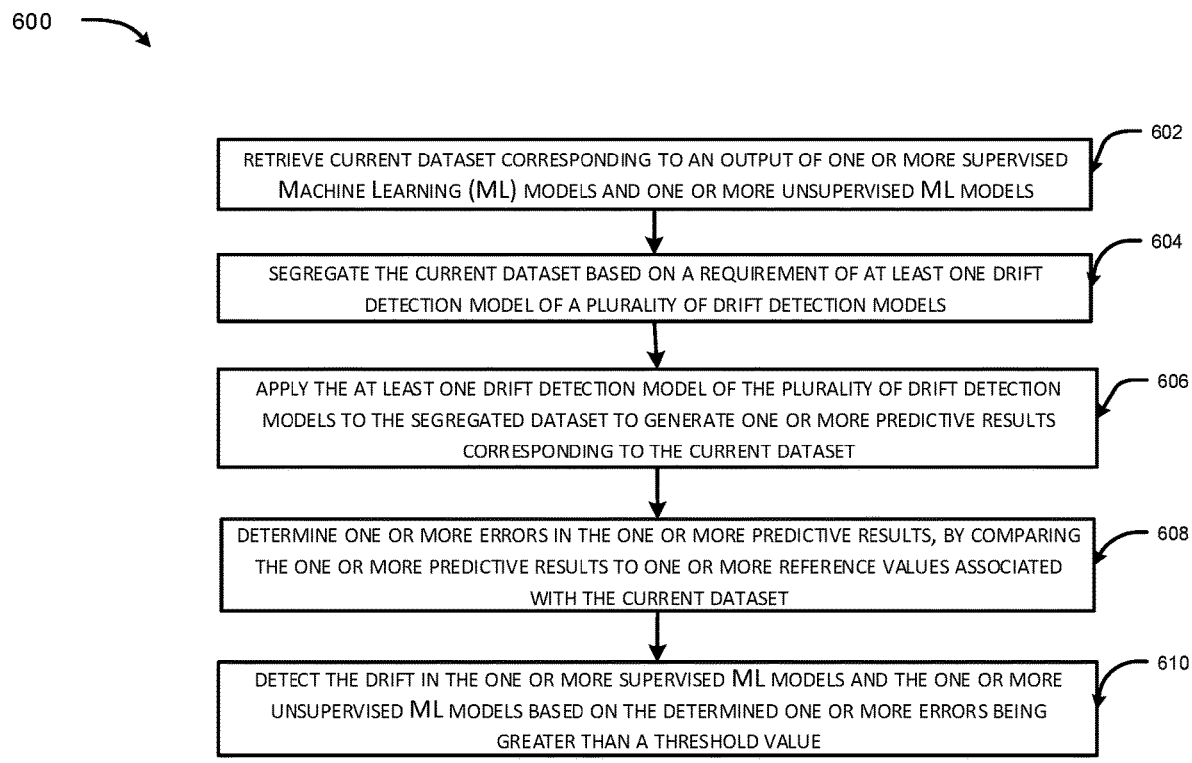
FIG. 6 illustrates an exemplary flow diagram representation of method for detecting a drift in supervised and unsupervised Machine Learning (ML) models, in accordance with an embodiment of the present disclosure.

FIG. 6 illustrates an exemplary flow diagram representation of method (600) for detecting a drift in supervised and unsupervised ML models, in accordance with an embodiment of the present disclosure.

At step (602), the method (600) may include retrieving, by a processor (202) associated with a system (110), current dataset corresponding to an output of one or more supervised ML models and one or more unsupervised ML models.

At step (604), the method (600) may include segregating, by the processor (202), the current dataset based on a requirement of at least one drift detection model of a plurality of drift detection models.

At step (606), the method (600) may include applying, by the processor (202), the at least one drift detection model of the plurality of drift detection models to the segregated dataset to generate one or more predictive results corresponding to the current dataset.

At step (608), the method (600) may include determining, by the processor (202), one or more errors in the one or more predictive results by comparing the one or more predictive results to one or more reference values associated with the current dataset.

At step (610), the method (600) may include detecting, by the processor (202), a drift in the one or more supervised ML models and the one or more unsupervised ML models, if the determined one or more errors is above a threshold value. The one or more supervised ML models and the one or more unsupervised ML models are corrected based on the detected drift.

Figure 7:
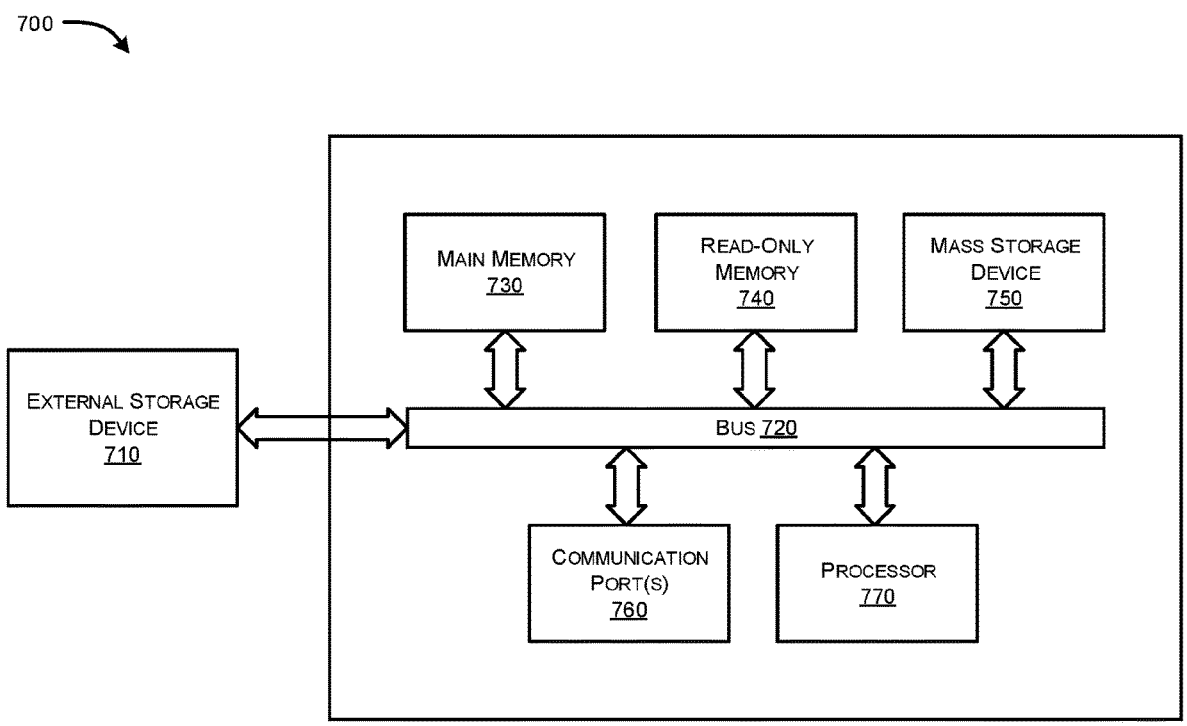
FIG. 7 illustrates an exemplary computer system in which or with which embodiments of the present disclosure may be utilized, in accordance with embodiments of the present disclosure.

FIG. 7 illustrates an exemplary computer system (700) in which or with which embodiments of the present disclosure may be utilized, in accordance with embodiments of the present disclosure.

As shown in FIG. 7, the computer system (700) may include an external storage device (710), a bus (720), a main memory (730), a read-only memory (740), a mass storage device (750), communication port(s)(760), and a processor (770). A person skilled in the ant will appreciate that the computer system (700) may include more than one processor and communication ports. The processor (770) may include various modules associated with embodiments of the present disclosure. The communication port(s) (760) may be any of an RS-232 port for use with a modem-based dialup connection, a 10/100 Ethernet port, a Gigabit or 10 Gigabit port using copper or fibre, a serial port, a parallel port, or other existing or future ports. The communication port(s) (760) may be chosen depending on a network, such a Local Area Network (LAN), Wide Area Network (WAN), or any network to which the computer system (700) connects. The main memory (730) may be Random Access Memory (RAM), or any other dynamic storage device commonly known in the art. The read-only memory (740) may be any static storage device(s) e.g., but not limited to, a Programmable Read Only Memory (PROM) chips for storing static information e.g., start-up or Basic Input/Output System (BIOS) instructions for the processor (770). The mass storage device (750) may be any current or future mass storage solution, which may be used to store information and/or instructions. Exemplary mass storage devices include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces).

The bus (720) communicatively couples the processor (770) with the other memory, storage, and communication blocks. The bus (720) may be, e.g., a Peripheral Component Interconnect (PCI)/PCI Extended (PCI-X) bus, Small Computer System Interface (SCSI), Universal Serial Bus(USB) or the like, for connecting expansion cards, drives, and other subsystems as well as other buses, such a front side bus (FSB), which connects the processor (770) to the computer system (700).

Optionally, operator and administrative interfaces, e.g., a display, keyboard, and a cursor control device, may also be coupled to the bus (720) to support direct operator interaction with the computer system (700). Other operator and administrative interfaces may be provided through network connections connected through the communication port(s) (760). The external storage device (710) may be any kind of external hard-drives, floppy drives, etc. Components described above are meant only to exemplify various possibilities. In no way should the aforementioned exemplary computer system (700) limit the scope of the present disclosure.

While considerable emphasis has been placed herein on the preferred embodiments, it will be appreciated that many embodiments can be made and that many changes can be made in the preferred embodiments without departing from the principles of the disclosure. These and other changes in the preferred embodiments of the disclosure will be apparent to those skilled in the art from the disclosure herein, whereby it is to be distinctly understood that the foregoing descriptive matter to be implemented merely as illustrative of the disclosure and not as limitation.

ADVANTAGES OF THE PRESENT DISCLOSURE

The present disclosure provides systems and methods for detecting a drift in supervised and unsupervised machine learning models.

The present disclosure provides systems and methods for obtaining a result of a drift in a model based on various methods and characteristics of the model being changed as per change in time.

The present disclosure provides systems and methods for detecting a drift and providing a cause for the detected drift, based on analysis, study, and results for past dataset and present dataset.

The present disclosure provides an improvement in drift detection with different types of drifts like abrupt, gradual, incremental, or reoccurring, as data drift is a change in statistical properties of data over a period.

The present disclosure enables data-drift detection for a variation in production data from the data that was used to test and validate the model before deploying the model.

The present disclosure provides systems and methods for identifying the source of the drift which involves assessing the underlying drift in features relative to the input importance.

RESERVATION OF RIGHTS

A portion of the disclosure of this patent document contains material which is subject to intellectual property rights such as, but are not limited to, copyright, design, trademark, Integrated Circuit (IC) layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

We claim:

1. A system for detecting a drift in supervised Machine Learning (ML) models and unsupervised ML model, the system comprising:
   a processor; and
   a memory coupled to the processor, wherein the memory comprises processor-executable instruction, which on execution, cause the processor to:
   retrieve current dataset corresponding to an output of one or more supervised ML models and one or more unsupervised ML models;
   segregate the current dataset based on a requirement of at least one drift detection model of a plurality of drift detection models;
   apply the at least one drift detection model of the plurality of drift detection models to the segregated dataset to generate one or more predictive results corresponding to the current dataset;
   calculate a sliding window probability of the current dataset;

track maximum probability values in the current dataset based on the calculated sliding window probability;
determine one or more correct prediction results from the maximum probability values;
detect the drift in the one or more supervised ML models and the one or more unsupervised ML models based on the one or more correct prediction results being below a pre-defined maximum probability value and a pre-defined probability threshold value;
determine one or more errors in the one or more predictive results by comparing the one or more predictive results to one or more reference values associated with the current dataset; and
detect the drift in the one or more supervised ML models and the one or more unsupervised ML models based on the determined one or more errors being greater than a threshold value, wherein the one or more supervised ML models and the one or more unsupervised ML models are corrected based on the detected drift.

2. The system as claimed in claim 1, wherein, to apply the at least one drift detection model of the plurality of drift detection models, the processor is configured to:
train the plurality of drift detection models using a historical dataset and the current dataset;
increment a counter when the one or more errors are determined in the one or more predictive results from the plurality of drift detection models trained using the historical dataset;
decrement the counter when the one or more errors are determined in the one or more predictive results from the plurality of drift detection models trained using the current dataset; and
detect the drift in the one or more supervised ML models and the one or more unsupervised ML models based on a count in the counter being greater than a predefined count threshold value.

3. The system as claimed in claim 1, wherein, to apply the at least one drift detection model of the plurality of drift detection models, the processor is configured to:
segregate the current dataset into a training dataset and a test dataset;
train the plurality of drift detection models using the training dataset;
generate the one or more predictive results using the test dataset;
calculate a first error rate from one or more errors in the generated one or more predictive results corresponding to the test dataset;
shuffle the current dataset and segregate the shuffled dataset into training dataset and test dataset in response to calculating the first error rate;
train the plurality of drift detection models using the training dataset associated with the shuffled dataset;
generate the one or more predictive results using the test dataset associated with the shuffled dataset;
calculate a second error rate from one or more errors in the generated one or more predictive results corresponding to the test dataset associated with the shuffled dataset; and
detect the drift in the one or more supervised ML models and the one or more unsupervised ML models based on a difference between the first error rate and the second error rate being greater than a pre-defined error rate threshold value.

4. The system as claimed in claim 1, wherein, to apply the at least one drift detection model of the plurality of drift detection models, the processor (202) is configured to:
segregate the current dataset into a first dataset and a second dataset, and segregate each of the first dataset and the second dataset into first partition data and second partition data;
calculate a kernel-based distribution from the first partition data;
calculate a log probability between the second partition data of the first dataset and the second dataset; and
determine a difference in the kernel-based distribution from the calculated log probability.

5. The system as claimed in claim 1, wherein, to apply the at least one drift detection model of the plurality of drift detection models, the processor is configured to:
create an artificial label;
assign a '1' value to a first dataset of the current dataset and '−1' value to a second dataset of the current dataset;
classify the first dataset and the second dataset using a binary classifier built on the current dataset with k fold cross validation, based on the assigned value;
determine an accuracy score for the classification of the first dataset and the second dataset using the binary classifier, and
detect the drift in the one or more supervised ML models and the one or more unsupervised ML models based on the accuracy score being greater than a pre-defined accuracy threshold value.

6. The system as claimed in claim 1, wherein the current dataset is segregated to determine a data point in the current dataset based on detecting the drift in the one or more supervised ML models and the one or more unsupervised ML models.

7. The system as claimed in claim 1, wherein the detected drift is a statistic indicative of the drift in the one or more supervised ML models and the one or more unsupervised ML models.

8. The system as claimed in claim 1, wherein the plurality of drift detection models for detecting the drift in the one or more supervised ML models comprises at least one of a Fast Hoeffding Drift Detection Method (FHDDM), a Paired Learner (PL), and a Shuffling and Resampling (SR).

9. The system as claimed in claim 1, wherein the plurality of drift detection models for detecting the drift in the one or more unsupervised ML models comprises at least one of a Kullback Leibler (KL) Divergence, a Kolmogorov Smirnov Test (KS), a Cramer Von Mises Test (CVM), an Anderson Darling Test (AD), a Kernel Based Distribution Discrepancy Test (KBDD), and a Virtual Classifier (VC).

10. A method for detecting a drift in supervised and unsupervised Machine Learning (ML) models, the method comprising:
retrieving, by a processor associated with a system, current dataset corresponding to an output of one or more supervised ML models and one or more unsupervised ML models;
segregating, by the processor, the current dataset based on a requirement of at least one drift detection model of a plurality of drift detection models;
applying, by the processor, the at least one drift detection model of the plurality of drift detection models to the segregated dataset to generate one or more predictive results corresponding to the current dataset;
calculating, by the processor, a sliding window probability of the current dataset;
tracking, by the processor, maximum probability values in the current dataset based on the calculated sliding window probability;

determining, by the processor, one or more correct prediction results from the maximum probability values:
detecting, by the processor, the drift in the one or more supervised ML models and the one or more unsupervised ML models based on the one or more correct prediction results being below a pre-defined maximum probability value and a pre-defined probability threshold value;
determining, by the processor, one or more errors in the one or more predictive results by comparing the one or more predictive results to one or more reference values associated with the current dataset; and
detecting, by the processor, the drift in the one or more supervised ML models and the one or more unsupervised ML models based on the determined one or more errors being greater than a threshold value, wherein the one or more supervised ML models and the one or more unsupervised ML models are corrected based on the detected drift.

11. The method as claimed in claim 10, wherein applying the at least one drift detection model of the plurality of drift detection models comprises:
training, by the processor, the plurality of drift detection models using a historical dataset and the current dataset;
incrementing, by the processor, a counter when the one or more errors are determined in the one or more predictive results from the plurality of drift detection models trained using the historical dataset;
decrementing, by the processor, the counter when the one or more errors are determined in the one or more predictive results from the plurality of drift detection models trained using the current dataset; and
detecting, by the processor, the drift in the one or more supervised ML models and the one or more unsupervised ML models based on a count in the counter being greater than a predefined count threshold value.

12. The method as claimed in claim 10, wherein applying the at least one drift detection model of the plurality of drift detection models comprises:
segregating, by the processor, the current dataset into a training dataset and a test dataset;
training, by the processor, the plurality of drift detection models using the training dataset;
generating, by the processor, the one or more predictive results using the test dataset;
calculating, by the processor, a first error rate from one or more errors in the generated one or more predictive results corresponding to the test dataset;
shuffling, by the processor, the current dataset and segregating the shuffled dataset into training dataset and test dataset in response to calculating the first error rate;
training, by the processor, the plurality of drift detection models using the training dataset associated with the shuffled dataset;
generating, by the processor, the one or more predictive results using the test dataset associated with the shuffled dataset; calculating, by the processor, a second error rate from one or more errors in the generated one or more predictive results corresponding to the test dataset associated with the shuffled dataset; and
detecting, by the processor, the drift in the one or more supervised ML models and the one or more unsupervised ML models based on a difference between the first error rate and the second error rate being greater than a predefined error rate threshold value.

13. The method as claimed in claim 10, wherein applying the at least one drift detection model of the plurality of drift detection models comprises:
segregating, by the processor, the current dataset into a first dataset and a second dataset, and segregating each of the first dataset and the second dataset into first partition data and second partition data;
calculating, by the processor, a kernel-based distribution from the first partition data;
calculating, by the processor, a log probability between the second partition data of the first dataset and the second dataset; and
determining, by the processor, a difference in the kernel-based distribution from the calculated log probability.

14. The method as claimed in claim 10, wherein applying the at least one drift detection model of the plurality of drift detection models comprises:
creating, by the processor, an artificial label;
assigning, by the processor, a '1' value to a first dataset of the current dataset and '−1' value to a second dataset of the current dataset;
classifying, by the processor, the first dataset and the second dataset using a binary classifier built on the current dataset with k fold cross validation based on the assigned value;
determining, by the processor, an accuracy score for the classification of the first dataset and the second dataset using the binary classifier, and detecting, by the processor, the drift in the one or more supervised ML models and the one or more unsupervised ML models based on the accuracy score being greater than a pre-defined accuracy threshold value.

15. The method as claimed in claim 10, wherein the current dataset is segregated to determine a data point in the current dataset based on detecting the drift in the one or more supervised ML models and the one or more unsupervised ML models.

16. The method as claimed in claim 10, wherein the detected drift is a statistic indicative of the drift in the one or more supervised ML models and the one or more unsupervised ML models.

17. The method as claimed in claim 10, wherein the plurality of drift detection models for detecting the drift in the one or more supervised ML models comprises at least one of a Fast Hoeffding Drift Detection Method (FHDDM), a Paired Learner (PL), and a Shuffling and Resampling (SR).

18. The method as claimed in claim 10, wherein the plurality of drift detection models for detecting the drift in the one or more unsupervised ML models comprises at least one of a Kullback Leibler (KL) Divergence, a Kolmogorov Smirnov Test (KS), a Cramer Von Mises Test (CVM), an Anderson Darling Test (AD), a Kernel Based Distribution Discrepancy Test (KBDD), and a Virtual Classifier (VC).

19. A User Equipment (UE) for detecting a drift in supervised and unsupervised Machine Learning (ML) models, the UE comprising:
a processor; and
a memory coupled to the processor, wherein the memory comprises processor-executable instruction, which on execution, cause the processor to:
retrieve current dataset corresponding to an output of one or more supervised ML models and one or more unsupervised ML models; segregate the current dataset based on a requirement of at least one drift detection model of a plurality of drift detection models;

apply the at least one drift detection model of the plurality of drift detection models to the segregated dataset to generate one or more predictive results corresponding to the current dataset;

calculate a sliding window probability of the current dataset;

track maximum probability values in the current dataset based on the calculated sliding window probability;

determine one or more correct prediction results from the maximum probability values;

detect the drift in the one or more supervised ML models and the one or more unsupervised ML models based on the one or more correct prediction results being below a pre-defined maximum probability value and a pre-defined probability threshold value;

determine one or more errors in the one or more predictive results, by comparing the one or more predictive results to one or more reference values associated with the current dataset; and detect the drift in the one or more supervised ML models and the one or more unsupervised ML models based on the determined one or more errors being greater than a threshold value, wherein the one or more supervised ML models and the one or more unsupervised ML models are corrected based on the detected drift.

* * * * *